United States Patent
Freeman et al.

(10) Patent No.: US 7,938,107 B2
(45) Date of Patent: *May 10, 2011

(54) VARIABLE STIFFNESS FLOW CONTROL VALVE

(75) Inventors: David C. Freeman, Watertown, MA (US); Alexander H. Slocum, Bow, NH (US); Daniel Kabat, Oxford, MI (US)

(73) Assignees: Ford Global Technologies, LLC, Dearborn, MI (US); Massachusetts Institute of Technology, Cambridge, MA (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/112,241

(22) Filed: Apr. 30, 2008

(65) Prior Publication Data

US 2008/0196779 A1  Aug. 21, 2008

Related U.S. Application Data

(62) Division of application No. 11/137,218, filed on May 24, 2005, now Pat. No. 7,370,645.

(60) Provisional application No. 60/575,452, filed on May 28, 2004, provisional application No. 60/678,114, filed on May 4, 2005.

(51) Int. Cl.
F02B 25/06 (2006.01)
(52) U.S. Cl. ....................................................... 123/572
(58) Field of Classification Search .............. 137/512.12, 137/859, 85; 251/902; 123/572–574, 512.12, 123/859, 85
See application file for complete search history.

(56) References Cited

U.S. PATENT DOCUMENTS

| 249,557 A | 11/1881 | Truesdell |
| 2,603,197 A | 7/1952 | Rowland |
| 3,455,285 A * | 7/1969 | Sheppard ..................... 123/574 |
| 3,990,471 A | 11/1976 | Schutzer et al. |
| 4,141,379 A | 2/1979 | Manske |
| 5,117,871 A | 6/1992 | Gardner et al. |
| 6,089,272 A * | 7/2000 | Brand et al. .................. 137/859 |

(Continued)

FOREIGN PATENT DOCUMENTS

JP          57195813          12/1982

OTHER PUBLICATIONS

Freeman, D. et al., "A Low Cost—High Precision Variable Stiffness Flexure Valve Element System," in Proceedings of the $4^{th}$ euspen International Conference, May 31-Jun. 2, 2004, Glasgow, Scotland, p. 408-409.

(Continued)

Primary Examiner — M. McMahon
(74) Attorney, Agent, or Firm — Julia Voutyras; Alleman Hall McCoy Russell & Tuttle LLP

(57) ABSTRACT

A flow control valve, comprising a flow controlling valve configured to deflect from a generally planar posture to an increasingly nonplanar posture responsive to a relative increase in pressure difference and flow across the valve element; and a support element including a support structure supporting the valve element in its undeflected state; at least a first contact surface recessed from the support structure and configured to engage the valve element only when the valve element is deflected; and a flow passage wherein an effective flow-through volume through the at least one opening and the flow passage decreases as deflection of the valve element increases.

18 Claims, 13 Drawing Sheets

U.S. PATENT DOCUMENTS

| | | |
|---|---|---|
| 6,253,749 B1 | 7/2001 | Kotwicki et al. |
| 6,889,674 B2 | 5/2005 | Pateman et al. |
| 6,945,277 B2 | 9/2005 | Schmalz et al. |
| 7,007,682 B2 * | 3/2006 | Takahashi et al. ............ 123/572 |
| 7,174,882 B2 | 2/2007 | Hezel et al. |
| 7,370,645 B2 * | 5/2008 | Freeman et al. .............. 123/574 |

OTHER PUBLICATIONS

U.S. Appl. No. 60/575,452, filed May 28, 2004, Slocum et al.
U.S. Appl. No. 60/678,114, filed May 4, 2005, Slocum et al.

* cited by examiner

Fig. 23A
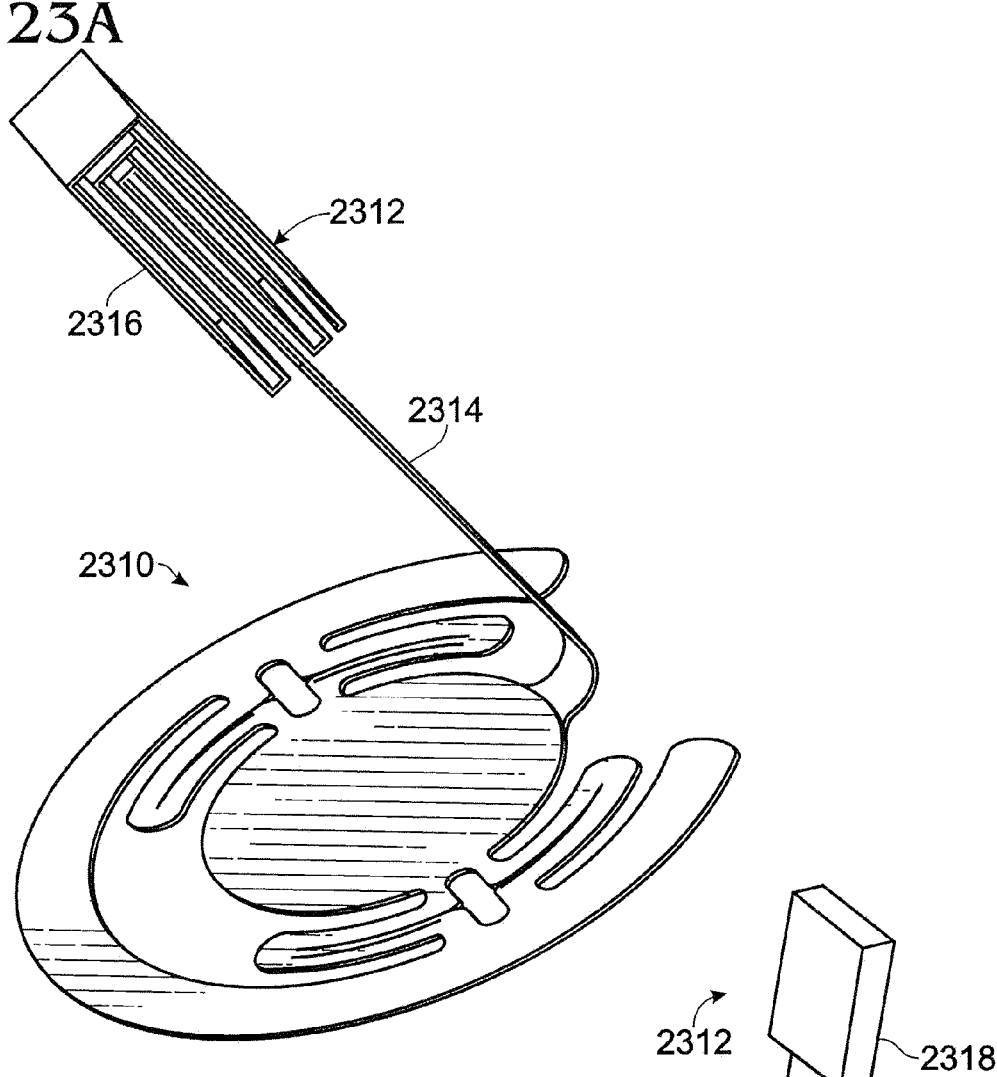
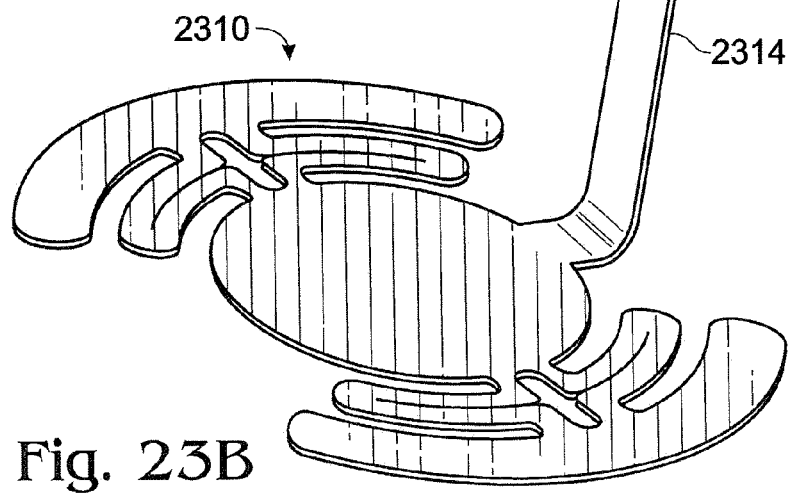
Fig. 23B

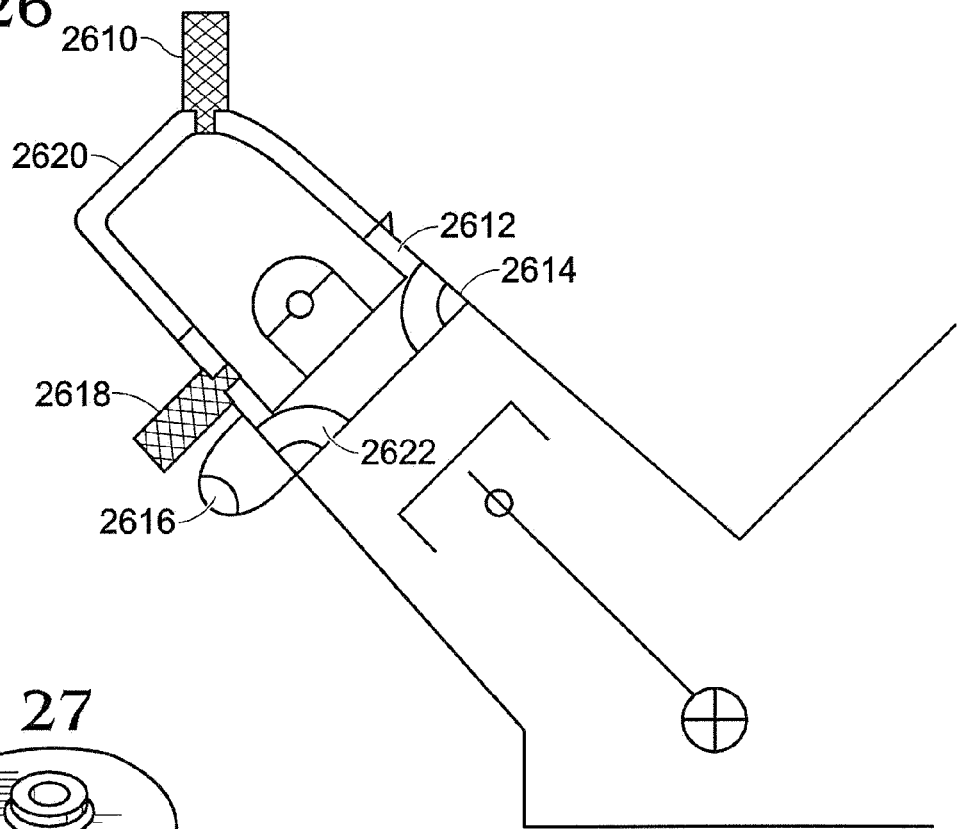
Fig. 26
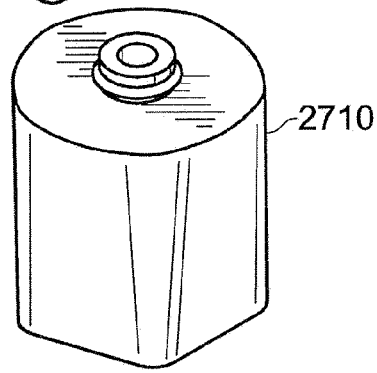
Fig. 27
Fig. 28
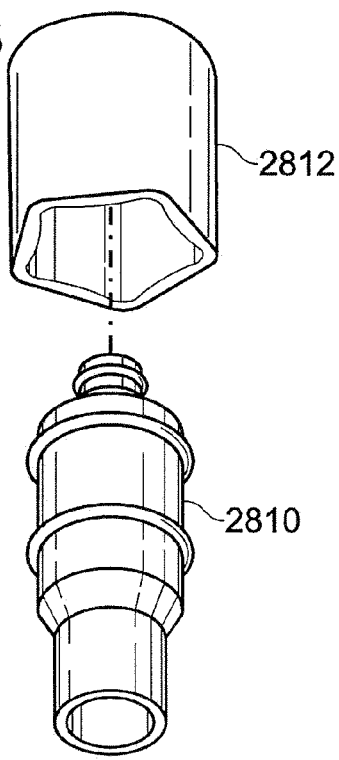
Fig. 29
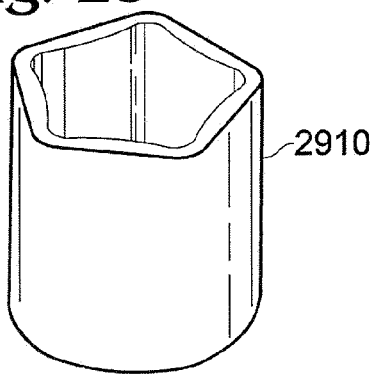

VARIABLE STIFFNESS FLOW CONTROL VALVE

CROSS REFERENCE TO RELATED APPLICATIONS

This is a divisional application of U.S. patent application Ser. No. 11/137,218 filed May 24, 2005, which claims the benefit of U.S. Provisional Application Nos. 60/575,452, filed May 28, 2004, and 60/678,114, filed May 4, 2005. The entirety of each of the above listed applications is incorporated by reference for all purposes.

BACKGROUND AND SUMMARY

Flow control valves can be used in numerous applications. In some types of flow control valves, performance is at least partially determined by the valve's ability to reliably produce a desired flow-through volume when subjected to a particular pressure difference or range of pressure differences.

One type of low-cost valve for flow control is described in U.S. Pat. Nos. 249,557, 3,990,471 and 5,117,871. Such valves, which may use linear force springs, typically limit their function to check valves, or back-flow prevention valves. Specifically, the need to characterize a rate of flow with respect to a sensible quantity such as pressure, temperature, humidity, displacement or chemical potential typically involves valves having a more complex fabrication, higher cost, and/or feedback control systems.

Therefore, in one aspect of this disclosure, a flow control valve includes a valve element and a support element, where the valve element is configured to deflect responsive to a change in pressure difference across the valve element. The support element cooperates with the valve element to present an effective flow-through area that changes as the valve element deflects. The amount of relative engagement between the valve element and the support element changes as the valve element deflects.

In this way, it is possible to obtain variable spring response depending on the amount of relative engagement. Thus, desired manufacturing costs and/or complexity may be achieved while still providing the ability for improved flow control accuracy, if desired. In one specific example, a non-linear spring system may be used to balance non-linear pressure forces, allowing it to regulate specified flow requirements.

In another specific example, a flow control valve may be used as a positive crankcase ventilation valve, which is an emissions control device that can route burned and unburned crankcase blowby gasses from the crankcase to an engine's intake manifold where the gasses can be burned. Besides reducing crankcase emissions, the recirculation of air through the crankcase can help remove moisture, and dilute NOx which otherwise could cause sludge to form. Thus a crankcase ventilation valve can extend the life of the oil and engine, in addition to reducing undesirable emissions.

According to another aspect of this disclosure, a crankcase ventilation flow control valve includes a valve element and a support element, where the valve element is configured to deflect responsive to a change in pressure difference across the valve element. The support element cooperates with the valve element to present an effective flow-through area that changes as the valve element deflects. The amount of relative engagement between the valve element and the support element changes as the valve element deflects.

In this way, improved crankcase ventilation flow control may be achieved during a variety of operating conditions, while reducing cost and/or manufacturing complexity.

BRIEF DESCRIPTION OF THE DRAWINGS

FIGS. 23A-F show various example embodiments of a valve element with and without additional holes and cantilevered masses.

FIG. 26 shows an example engine and valve location, and orientation configuration.

FIGS. 27, 28, and 29 show an example valve with insulation according to one embodiment.

WRITTEN DESCRIPTION

Figure 1:
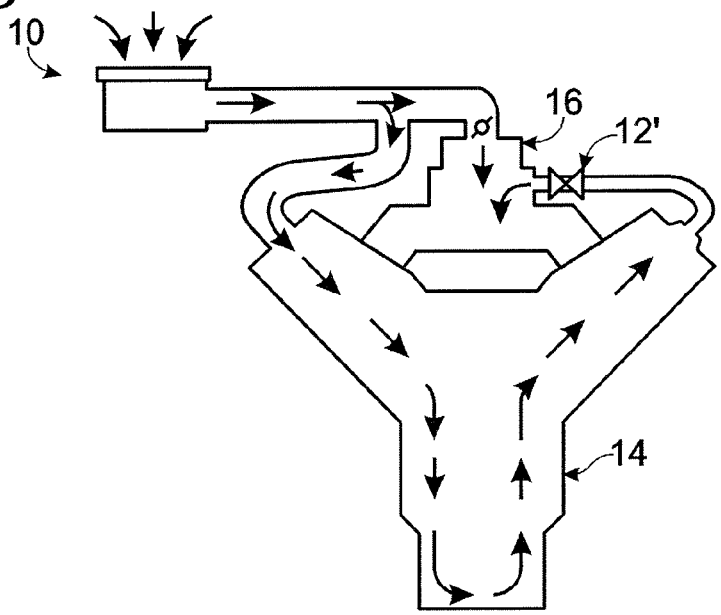
FIG. 1 schematically shows an exemplary flow control valve operatively interposed between a crankcase and an intake manifold in an engine.

FIG. 1, which is not necessarily to scale, schematically shows a portion of an engine 10, which includes a flow control valve 12' operationally interposed between a crankcase 14 and an intake manifold 16. In this case, flow control valve 12' directs flow to the manifold downstream of a throttle valve 18, although in alternative examples no throttle may be used, or the flow may be directed to other locations in an induction system of the engine, such as the cylinder head or upstream of a throttle valve. Further, the valve 12' may be positioned downstream of a mass airflow meter, and/or an air induction filter. Also, the valve 12' may be interposed between an intake valve side of the crankcase and the intake manifold in one embodiment. In another embodiment, the valve may be may be interposed between an exhaust valve side of the crankcase and the intake manifold. In still another embodiment, the valve may be positioned relatively between an intake and exhaust valve side of the crankcase and the intake manifold.

In one embodiment, flow control valve 12' can function as a crankcase ventilation valve, which allows burned and unburned crankcase blowby gasses to flow back to the intake manifold so that the gasses may be burned. FIG. 1 uses a prime character (') to emphasize that flow control valve 12' is a nonlimiting example of the variety of different flow control valves contemplated by this disclosure. This disclosure is not limited to crankcase ventilation valves, since, for example, the various valves disclosed herein may be used as exhaust gas recirculation valves, purge flow control valves, or valves in a variety of other products such as consumer products, HVAC systems, and others.

Furthermore, flow control valve 12' is a nonlimiting example of a flow control valve that can be used as a crankcase ventilation valve in an engine. Flow control valves as described, illustrated, and claimed in this disclosure can be used in place of most, if not all, typical crankcase ventilation valves, and the particular embodiment schematically illustrated in FIG. 1 is in no way meant to limit the different possible implementations of a flow control valve in an engine.

Figure 2:
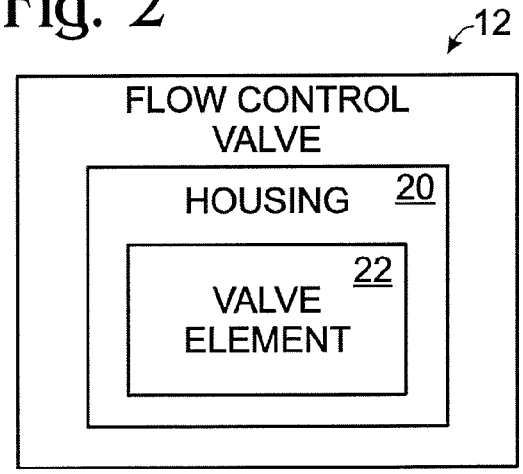
FIG. 2 schematically shows an exemplary flow control valve.

FIG. 2 schematically shows a flow control valve 12, which includes a housing 20 and a valve element 22. In general, housing 20 can serve as a means for conveying a fluid, including a gas or a mixture of different gasses. As a nonlimiting example, housing 20 can be configured to convey unburned blowby gasses at least part of the way between a crankcase and an intake manifold. Housing 20 can be a static housing that does not include any moving parts, although this is not required in all embodiments. Likewise, in some embodiments, housing 20 can be made from only two different parts, while in some embodiments, housing 20 can be made from one part or three or more parts.

In general, valve element 22 can serve as a means for restricting conveyance of fluid through the housing. In some embodiments, the valve element can influence the effective flow-through volume of a fluid through the housing by serving as a physical obstruction to the fluid flowing through the housing. Furthermore, the degree to which the valve element obstructs, or otherwise restricts, fluid flowing through the housing can change in response to changing pressures. For example, the valve element can serve as a greater obstruction as a pressure differential increases across the valve element. As described in more detail below, the precise degree to which the valve element restricts fluid flowing through the housing can be tuned by controlling how the valve element interacts with the housing throughout a range of pressure differences and/or by giving the valve element and/or the housing a particular shape and/or composition. In some embodiments, a flow control valve can be configured so that a valve element responds to high frequency vortex shedding with high frequency vibrations that help reduce freezing of the valve element.

In one embodiment, a single macro-sized valve is shown for controlling flow. However, in an alternative embodiment, valves can be grouped in parallel or in series, and also can be formed on a micro-scale.

Figure 3:
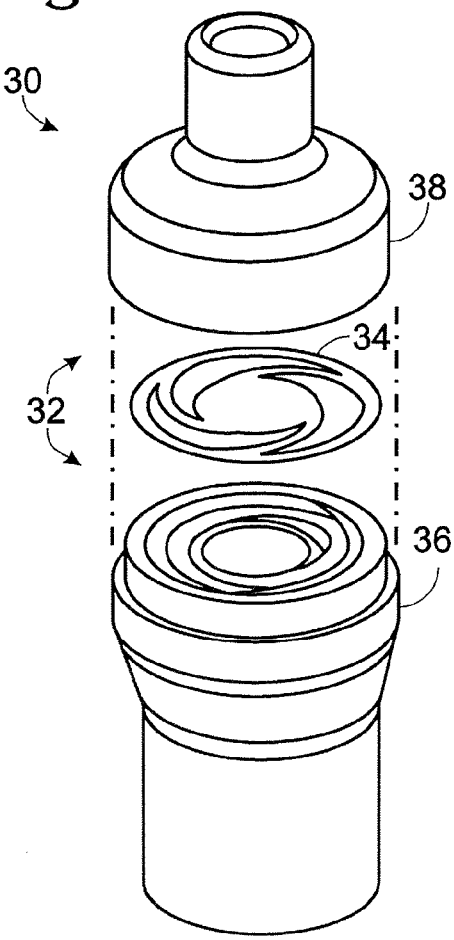
FIG. 3 is an axonometric projection of an exemplary flow control valve.

FIG. 3 shows an exemplary three-piece flow control valve 30, which includes an exemplary housing 32 and an exemplary valve element 34. In the illustrated embodiment, housing 32 is a two-piece housing consisting of a one-piece support element 36 and a one-piece top 38. Furthermore, housing 32 is a static housing, which includes no moving springs, hinges, or other components. Such a housing configuration is a nonlimiting example of the numerous differently configured housings that can cooperate with a valve element to present a variable effective flow-through area. This disclosure is not limited to a two-piece housing and/or a static housing.

Figure 4:
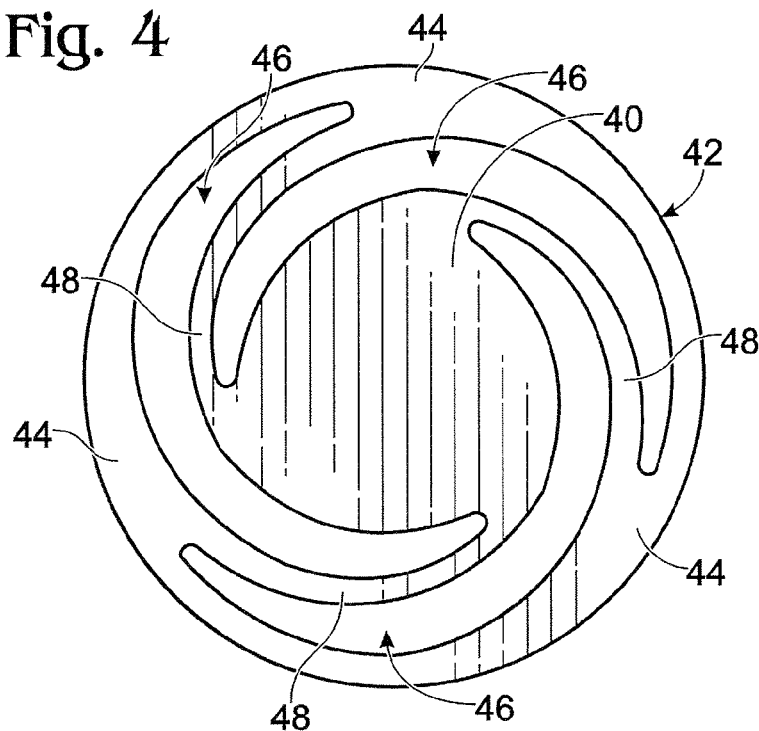
FIG. 4 is a plan view of an exemplary valve element of the flow control valve of FIG. 3.

FIG. 4 is a plan view of an exemplary one-piece valve element 34. As described herein, element 34 is a flexible valve element. Unlike valve element assemblies in other flow control valves, one-piece valve element 34 is not connected to a coil spring. To the contrary, valve element 34 serves as its own spring.

Valve element 34 includes a flow-blocking surface 40 located away from a periphery 42 of the valve element. Flow-blocking surface 40 can be substantially solid, and thus, virtually impermeable to fluids, including gasses. Even if not completely impermeable, the flow-blocking surface can present a significant obstacle to the flow of fluid, thus effectively diverting fluid to a less obstructed route.

Valve element 34 includes openings 46 which provide a substantially unobstructed path for a fluid to flow around flow-blocking surface 40. In the illustrated embodiment, valve element 34 includes three generally slit-shaped, spiraling openings. Some embodiments may include more or fewer openings and/or differently shaped openings. The collective size of the openings can be selected to allow a desired flow-through and/or to leave enough bridge material to provide a desired level of stiffness. Flow-through and/or valve element stiffness are parameters that can vary from one application to another, and thus being able to control these parameters via valve element configuration is desirable.

Valve element 34 also includes, near the periphery of the valve element, a seating portion 44, which is configured to continually engage housing 32. By "continually engage," it is meant that the seating portion contacts the housing when the valve element is undeflected and when the valve element deflects towards a contact surface of the housing (a process described in detail below). "Continual engagement" is not meant to describe a situation when the valve element is deflecting in the opposite direction. If the valve element deflects or moves in the opposite direction, away from a contact surface, the seating portion may lose contact with the housing in some embodiments, although contact will be restored when the valve element again deflects towards the contact surface. This is not a disruption in "continual engagement," as used herein.

A valve element can include one or more bridge portions that span the distance between the flow-blocking surface and the seating portion. In the illustrated embodiment, valve element 34 includes three bridge portions 48, although any particular number of bridge portions is not required. As can be seen, bridge portions 48 at least partially define openings 46. A bridge portion can flex, allowing a flow-blocking surface to move in a direction generally perpendicular to the face of the flow-blocking surface. While the flow-blocking-surface and/or the seating portion may also flex in some embodiments, the bridge portions usually will exhibit relatively more flexibility than either the seating portion or the flow-blocking surface, although this is not required.

The size and shape of the bridge portions can contribute to the flexure characteristics of the valve element. In some embodiments, the bridge portions can be configured with a stiffness that results in a valve element that behaves as a substantially linear spring. However, as described below, a housing can be configured to interact with the valve element to produce a nonlinear stiffness, which can be beneficial, for example, when a flow control valve is controlling flow resulting from nonlinear pressure forces.

Figure 5:
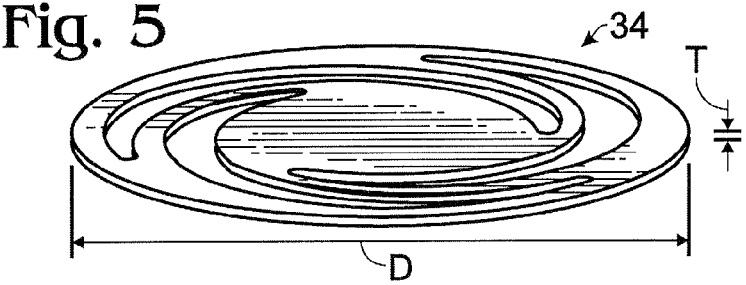
FIG. 5 is an axonometric projection of the valve element of FIG. 4.

As can be seen in FIG. 5, valve element 34 is generally disk-shaped. As used herein, "disk-shaped" refers to the relative lack of thickness of an object compared to its other dimensions (width, length, diameter, etc.). For example, valve element 34 has a thickness T that is substantially less than its diameter D. Disk-shaped objects need not have circular or otherwise rounded top profiles, such as the generally circular profile of exemplary valve element 34. As used herein, a "disk" can have a rectangular, triangular, polygonal, abstract, or other profile. Because of the generally disk-shape of the valve element, and because the valve element serves as its own spring instead of relying on an attached coil spring, or similar device, valve element 34 can be substantially smaller than valve element assemblies used in other flow control valves, particularly in the dimension that parallels the flow of fluid through the flow control valve.

Figure 6:
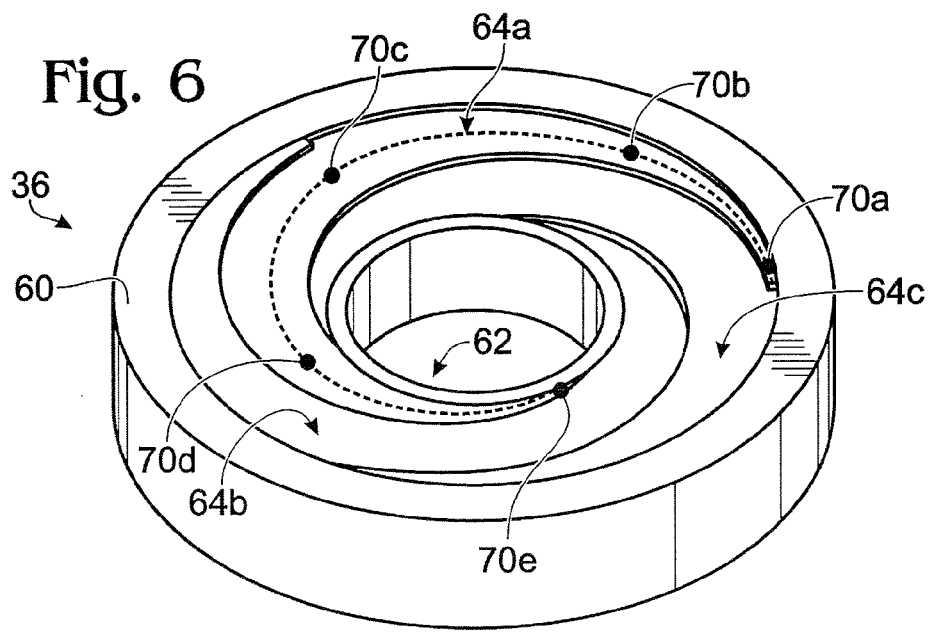
FIG. 6 is an axonometric projection of an exemplary support element of the flow control valve of FIG. 3.
Figure 7:
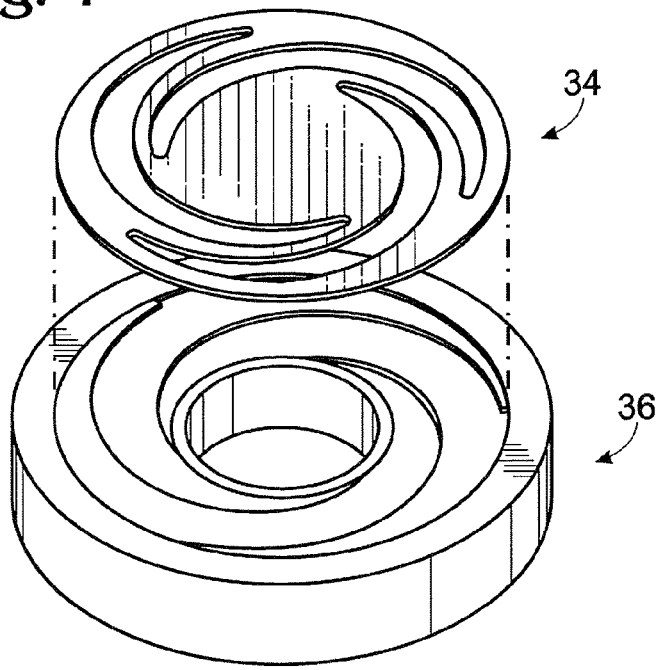
FIG. 7 is an exploded view of the valve element of FIGS. 4 and 5 and the support element of FIG. 6.
Figure 8:
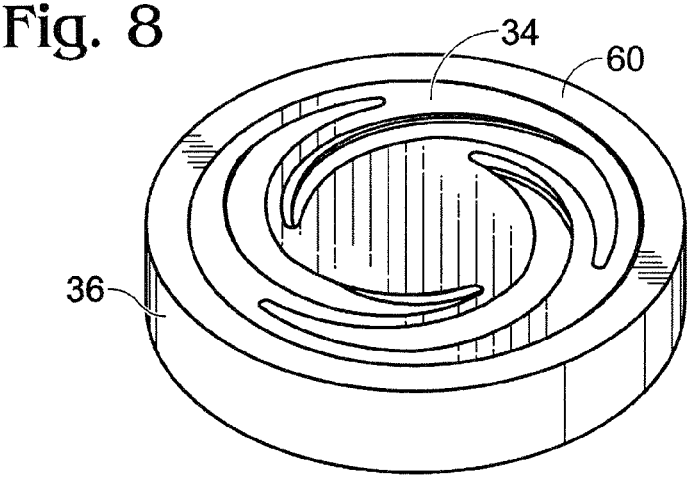
FIG. 8 is an axonometric projection of the valve element of FIGS. 4 and 5 and the support element of FIG. 6.

FIGS. 6 and 7 show exemplary support element 36, which includes a support structure 60, a flow passage 62, and a contact surface 64. Support structure 60 can be shaped to engage at least the seating portion of the valve element. In some embodiments, the support structure can have substantially the same profile as the profile of the valve element. In some embodiments, the support structure can have a similarly shaped, but slightly larger profile than the profile of the valve element. In some embodiments, the profile of the support structure can be shaped differently than the profile of the valve element. As shown in FIG. 8, support structure 60 has a circular profile, as does corresponding valve element 34.

The support structure can be sized to provide stable contact with the valve element. In some embodiments, the support structure can be sized to contact a substantial portion of the valve element, including the bridge portions of the valve element, thereby effectively stiffening the valve element. However, because the support structure supports the valve element, it generally does not variably affect the stiffness of the valve element in the same manner as the contact surface; however, a variably stiffening support structure is not outside the scope of this disclosure.

Flow passage 62 is a passage through which fluids can pass on the way in or out of the flow control valve. The flow passage can be sized to achieve a desired flow-through volume, although, as described below, the size of the flow passage generally is not the limiting factor in determining flow-through. In some embodiments, the flow passage may be shaped to reduce noise and/or vibrations.

A housing of a valve element can include one or more contact surfaces that can engage portions of a valve element, such as the bridge of a valve element, and thereby effectively stiffen the valve element. The relative amount of engagement between the valve element and one or more contact surfaces, and/or the relative amount of engagement between the valve element and the contact surface, can change as deflection of the valve element changes. For example, in some embodiments, a contact surface can be shaped so that no part of the contact surface touches the valve element when the valve element is undeflected, but a portion of the contact surface touches the valve element when the valve element is at least partially deflected. In some embodiments, a portion, but not all, of a contact surface will touch the valve element when the valve element is undeflected. In either case, as the valve element increasingly deflects, engagement between the valve element and the housing can increase, either progressively, or in discrete steps. A housing and valve element can be collectively configured so that a particular amount of deflection causes a desired amount of engagement between the valve element and the housing.

Engagement between the housing and the valve element can effectively stiffen the valve element, and a change in the amount of engagement can produce a corresponding change in the stiffness. For example, increased deflection can produce increased engagement, which in turn produces increased stiffness. The amount of effective stiffness that a particular valve element exhibits when deflected a particular amount can be controlled by controlling engagement between the valve element and the housing throughout a range of deflection. As explained by way of example below, the amount of engagement can be controlled, at least in part, by shaping the housing to engage the valve element by differing amounts as the level of valve element deflection changes.

Figure 9:
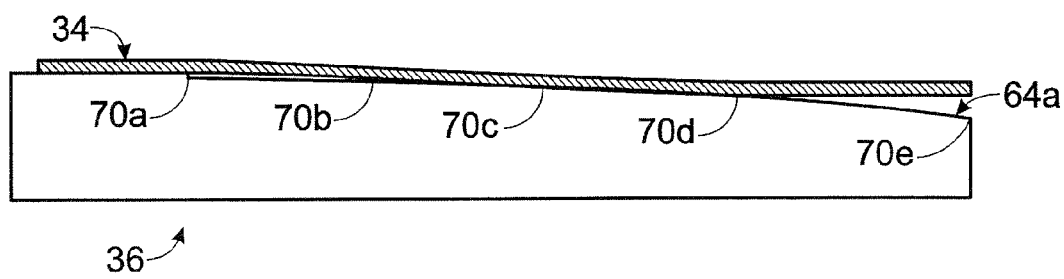
FIG. 9 is a somewhat schematic cross-section of a portion of the valve element of FIGS. 4 and 5 and a portion of the support element of FIG. 6, as the valve element deflects and a contact surface of the support element engages a portion of the valve element.

As shown in FIG. 6, contact surface 64 includes three spiraling ramp portions 64a, 64b, and 64c, which recess from just below support structure 60 downward to flow passage 62. The spiraling ramps can be sloped so that increasing portions of the spiraling ramps engage the bridge portions of the valve element as the valve element deflects downward towards flow passage 62. For example, FIG. 9 shows a two-dimensionally straightened representation of a cross-section of spiraling ramp portion 64a. The cross-section is not taken along a straight line, but rather along a spiral. Points 70a-70e in FIG. 6 correspond to points 70a-70e in FIG. 9, and the points can be used to show how the cross-section of the spiraling ramp has been represented two-dimensionally.

As can be seen in FIG. 9, valve element 34 is deflected enough to engage a portion of the spiraling ramp between point 70a and point 70d. The engagement between the spiraling ramps and valve element 34 effectively stiffens the valve element. If the valve element was less deflected, there would be less engagement between the valve element and the spiraling ramps, and, therefore, less effective valve element stiffness. If the valve element was more deflected, there could be more engagement between the valve element and the spiraling ramps, and, therefore, more effective valve element stiffness. Contact surface 64 is a nonlimiting example of a continuously sloping contact surface, and of a contact surface that engages progressively more of the valve element as deflection of the valve element increases. Some contact surfaces can have a substantially linear ramp, a slope that curves more or less than contact surface 64, or even a more complex shape. In general, for a particular amount of valve element deflection, a steeper and/or more quickly curving slope will provide less support than a less steep and/or more gradually curving slope, because less of the contact surface will engage the valve element. Therefore, the shape of the contact surface can be used to control the effective valve stiffness of the valve element, which in turn influences flow-through. A shape of the contact surface can be selected to result in linear valve element stiffness or a shape of the contact surface can be selected to result in nonlinear valve element stiffness.

Figure 10:
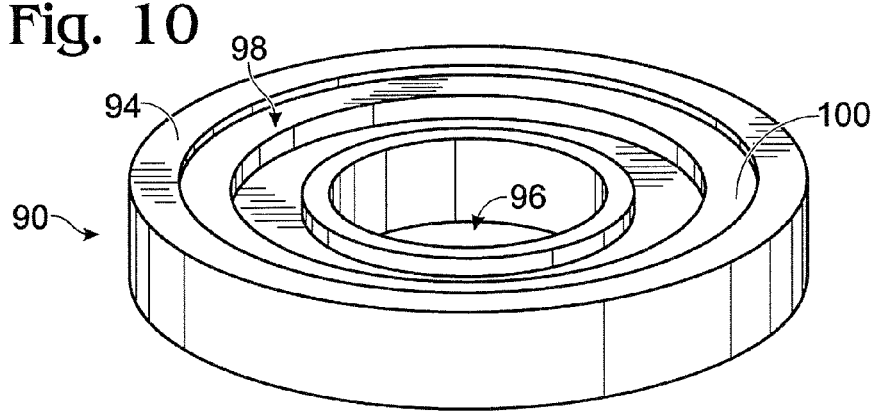
FIG. 10 is an axonometric projection of another exemplary support element.
Figure 11:
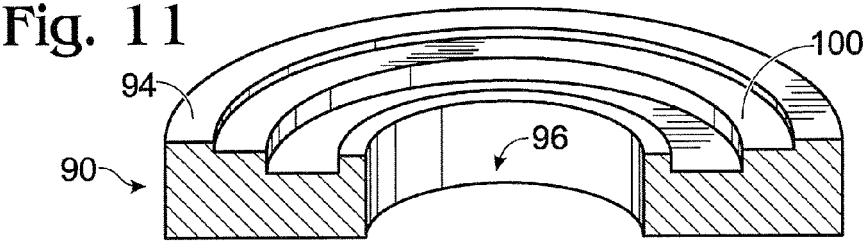
FIG. 11 is a cross-sectional view of the support element of FIG. 10.
Figure 12:
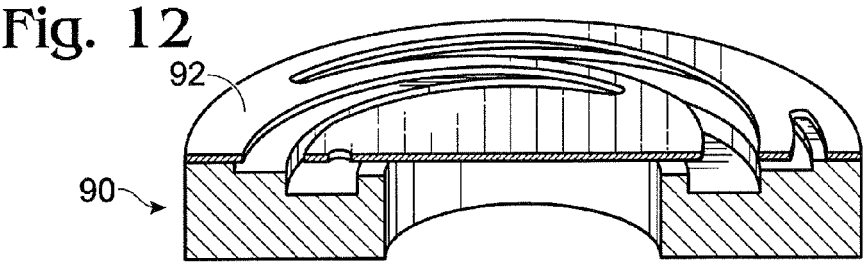
FIG. 12 is a cross-sectional view of the support element of FIG. 10 and an exemplary valve element.

In some embodiments, a contact surface will not be continuously sloping, but rather will be characterized by one or more discrete contact surfaces that engage discrete segments of a valve element, while other segments are not engaged. FIGS. 10-12 show a support element 90, which is configured to cooperate with a valve element to present an effective flow-through area that changes as the valve element deflects, similar to support element 36 of FIGS. 6-9. Like support element 36, support element 90 includes a support structure 94 and a flow passage 96. However, whereas support element 36 has a continuously sloping contact surface, support element 90 has a contact surface 98 that is characterized by a discrete step 100.

Figure 13A:
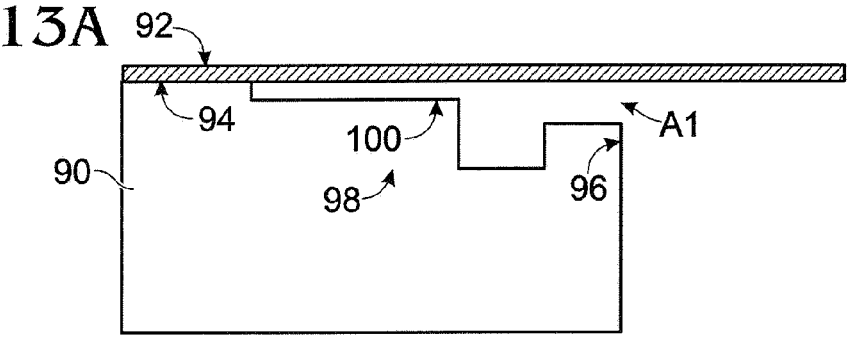
FIGS. 13a-13e show a somewhat schematic cross-section of a portion of the support element of FIG. 10 providing varying levels of support to a portion of a valve element as the valve element deflects.

FIGS. 13*a*-13*e* show a cross-section of a portion of support element 90 and a somewhat schematic representation of a portion of valve element 92. FIG. 13*a* shows the valve element in an undeflected, generally planar posture. In such a posture, the only portion of the support element that engages the valve element is support structure 94. Contact surface 98 does not engage the valve element. An effective flow-through area between the valve element and the contact surface of the support element is identified at $A_1$. The flow-through area is the area between the valve element and the support element, which is the area through which a fluid may flow from the openings in the valve element to the flow passage in the support element (or vice versa). In general, the greater the flow-through area, the less resistance there is to flow-through of a fluid. Of course, other parameters, such as pressure difference across the flow control valve, can also affect flow-through.

Figure 13B:
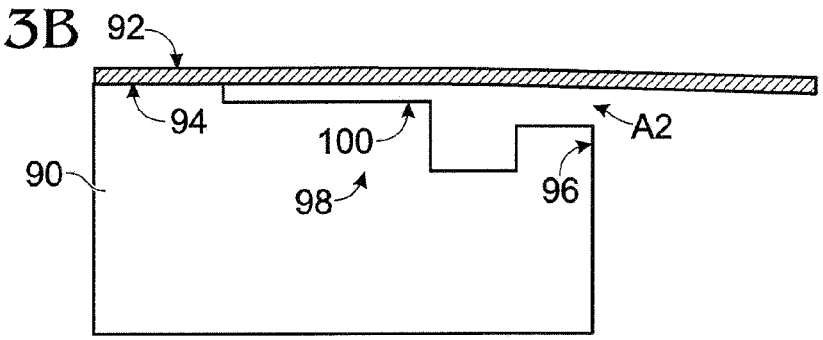

FIG. 13*b* shows valve element 92 in a slightly deflected posture, although the valve element is not sufficiently deflected so that contact surface 98 engages the valve element. Because the contact surface is not engaging the valve element, the contact surface is not yet contributing to the effective stiffness of the valve element. The flow-through area $A_2$ of FIG. 13*b* is less than flow-through area $A_1$ of FIG. 13*a*, and therefore, there is a greater resistance to flow-through.

Figure 13C:
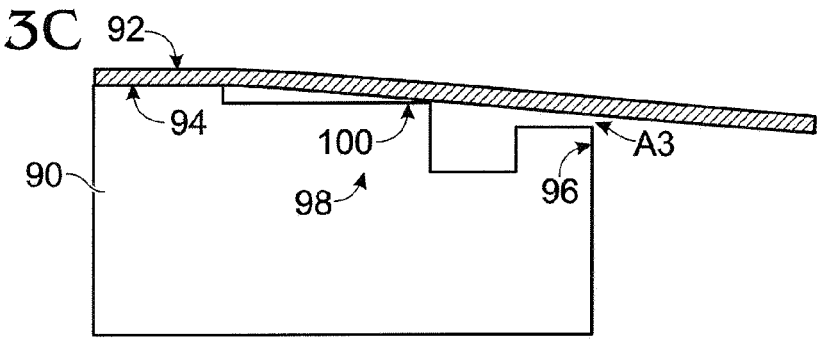

FIG. 13*c* shows valve element 92 deflected enough that step 100 of the contact surface engages the valve element, thus increasing the effective stiffness of the valve element. The valve element can have a first effective stiffness before contacting step 100, and a second, greater, effective stiffness after contacting step 100. As such, the stiffness may be nonlinear, or even discontinuous, throughout the range of valve element deflection. The flow-through area $A_3$ of FIG. 13*c* is less than the flow-through area of FIG. 13*b*, and therefore, there is an even greater resistance to flow-through.

Figure 13D:
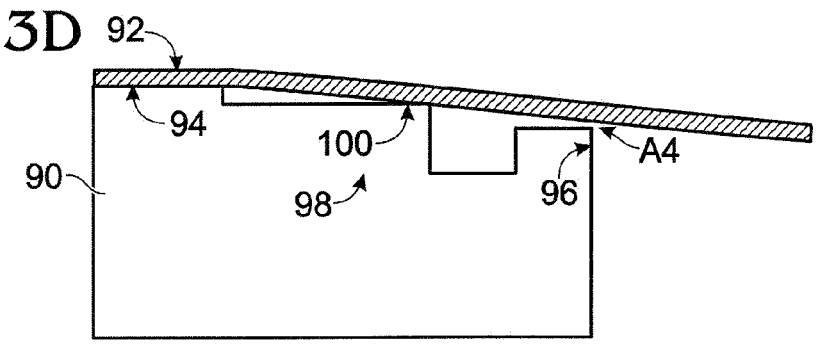

FIG. 13*d* shows valve element 92 deflected past the point where step 100 engages the valve element. As can be seen, it is possible for the valve element to continue flexing, even if the contact surface is engaging the valve element. Because the stiffness of the valve element may be relatively greater than if the contact surface were not engaging the valve element, it may take a greater change in the pressure difference across the valve element to produce the same amount of valve element deflection than if the contact surface were not engaging the valve element. Furthermore, because flow-through area $A_4$ is relatively small, there is a relatively high resistance to flow-through.

The amount of flow-through that results from the different valve element postures illustrated in FIGS. 13*a*-13*d* can depend on the pressure difference that produces each of the different postures. In general, greater pressure differences can cause increased valve element deflection, which results in less flow-through area. However, the greater pressure differences can also encourage greater flow-through. In other words, if not for the valve element, and the decreasing flow-through area, flow-through could increase unchecked as the pressure difference increased. However, the valve element can be configured to reduce the rate that the flow-through increases as the pressure difference increases to hold the flow-through substantially constant, or even cause the flow-through to decrease as the pressure difference increases. Furthermore, the contact surface can be shaped to produce a flow function, such as a linear flow function or a nonlinear flow function.

Figure 14:
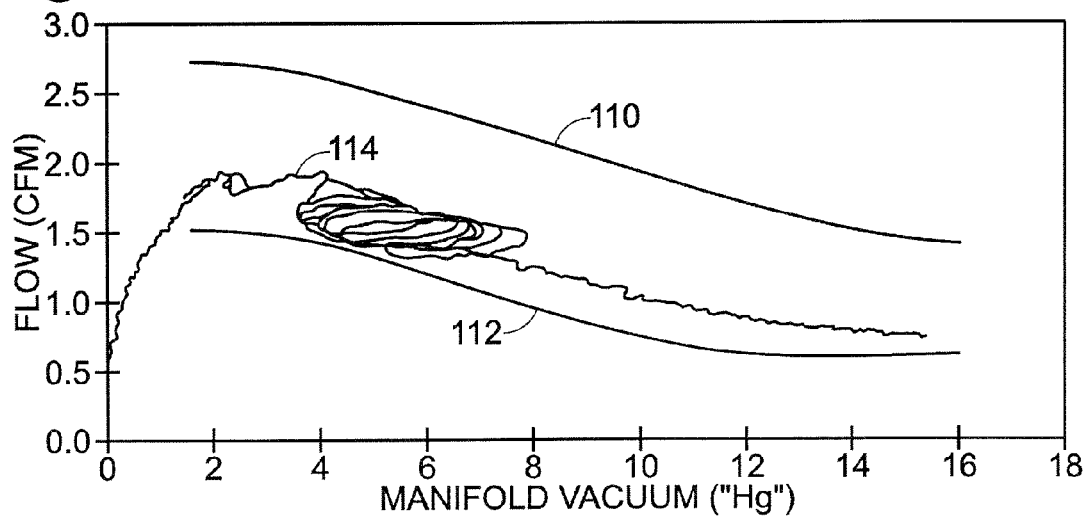
FIG. 14 is a flow versus pressure plot corresponding to the valve element components of FIGS. 10-12.

FIG. 14 plots flow (CFM) relative to pressure difference (Hg). A desired upper flow limit for one particular crankcase valve application is represented by line 110. Likewise, a desired lower flow limit is represented by line 112. Plot line 114 shows test data in which flow-through remains within the desired criteria through the range of applicable pressure differences. As can be seen, the flow function corresponding to FIG. 14 is a nonlinear function including a segment in which flow increases from about 0 Hg to 2 Hg, and then tapers off from about 2 Hg to 16 Hg. This is an example of a desired flow function, which can be achieved by support element 90 and valve element 92. Other flow functions can be achieved by changing the shape of the support element.

Figure 13E:
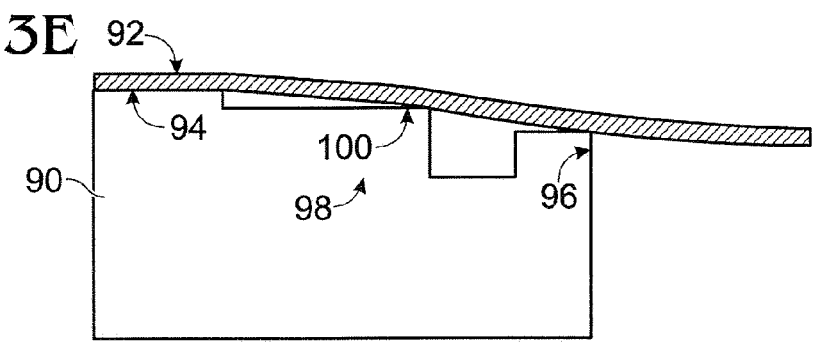

FIG. 13*e* shows valve element 92 sufficiently deflected so that a flow-blocking surface engages the opening of flow passage 96. It is not required that a valve element be able to engage the flow passage. However, in an embodiment in which the valve element can deflect sufficiently far so that the opening to the flow passage can engage the valve element, flow-through can be substantially, if not totally, stopped.

While FIGS. 10-13 show a support element that includes a single discrete step, it should be understood that in some embodiments a support element can have two or more discrete steps or contacting surfaces. In many applications, a single step is sufficient to provide a desired level of flow-through control. However, in some embodiments, two or more contact services can provide a greater degree of flow-through control. As mentioned above, a continuously sloping contact surface can be used in some embodiments, typically where a high degree of precision is desired.

Figure 15:
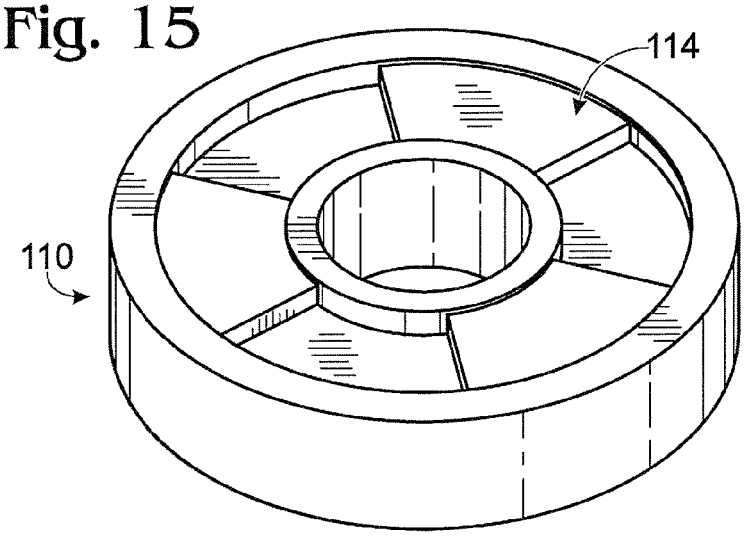
FIG. 15 is an axonometric projection of another exemplary support element.
Figure 16:
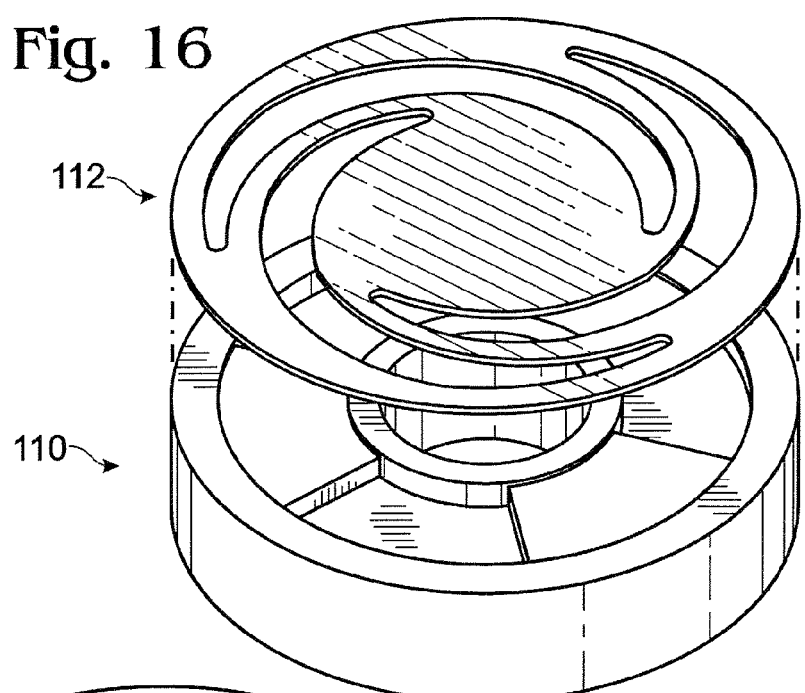
FIG. 16 is an exploded view of the support element of FIG. 15 and an exemplary valve element.
Figure 17:
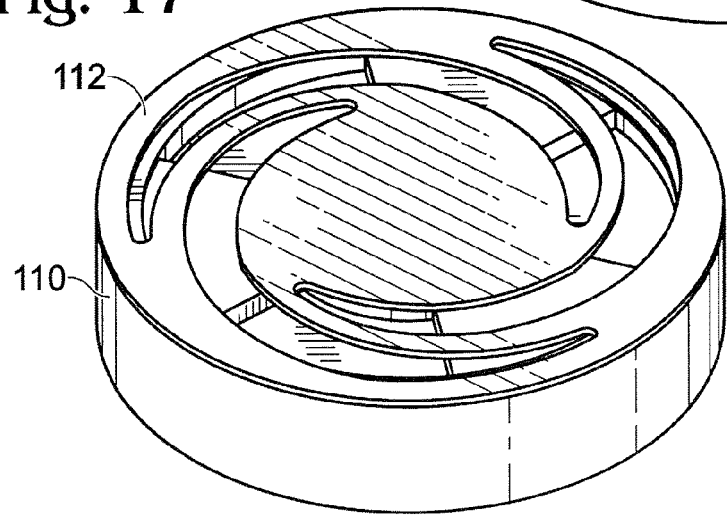
FIG. 17 is an axonometric projection of the support element of FIG. 15 and an exemplary valve element.

FIGS. 15-17 show yet another exemplary embodiment of a support element 110 and a valve element 112. As with the other support elements described herein, support element 110 includes a contacting surface 114 that is configured to variably engage the valve element as the valve element deflects in response to changes in the pressure difference across the valve element. Unlike contact surfaces described above, contact surface 114 includes steps that are radially orientated, extending from near a seat of the support element to near the flow passage of the support element.

A contact surface can be selected to cooperate with a valve element to produce a desired effective stiffness of the valve element, and thus a desired flow-through. Concentric steps, radially extending steps, spiraling ramps, and the other examples provided herein are not intended to limit this disclosure, but rather to demonstrate design flexibility. Virtually any contact surface is possible. In general, a contact surface should be shaped so that it engages a valve element at the point of valve element deflection in which increased effective stiffness is desired. In some embodiments, eccentric steps, unevenly-spaced steps, continuously curving surfaces with different profiles, or other contact surfaces can produce such a result.

Figure 18:
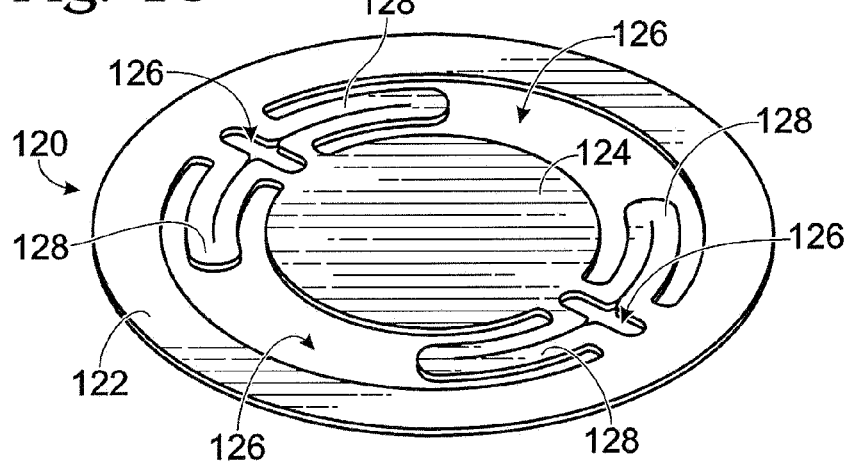
FIG. 18 is an axonometric projection of another exemplary valve element.
Figure 19:
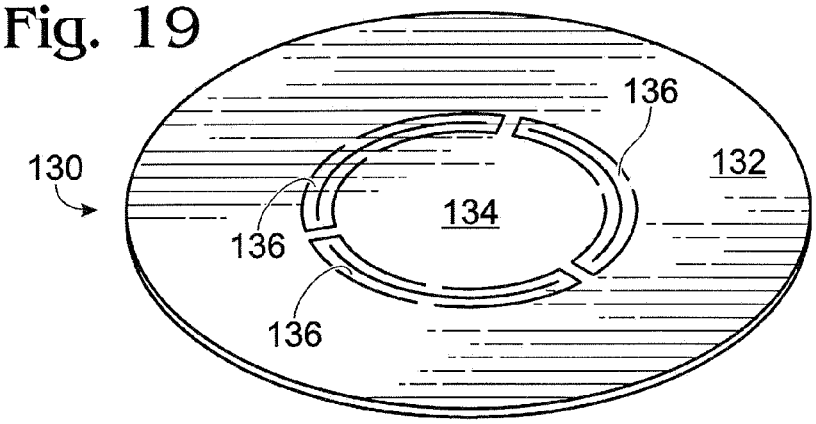
FIG. 19 is an axonometric projection of another exemplary valve element.
Figure 20:
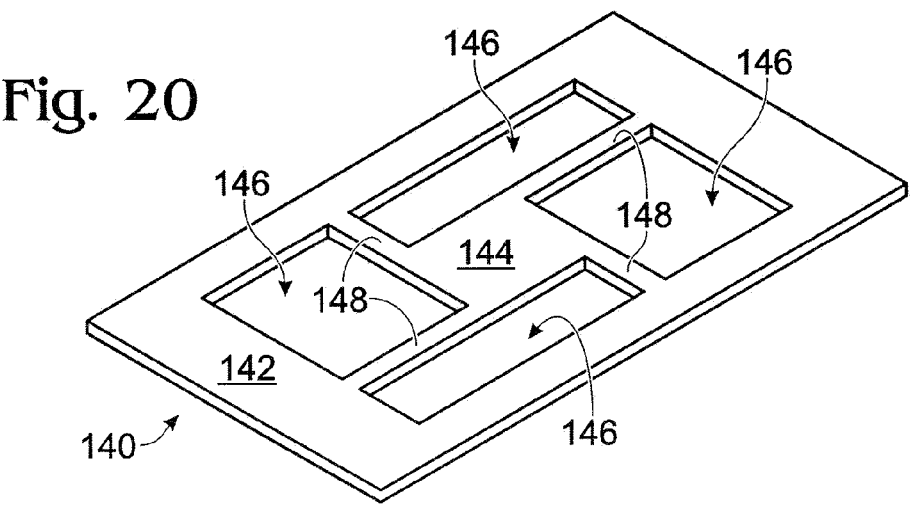
FIG. 20 is an axonometric projection of another exemplary valve element.
Figure 21:
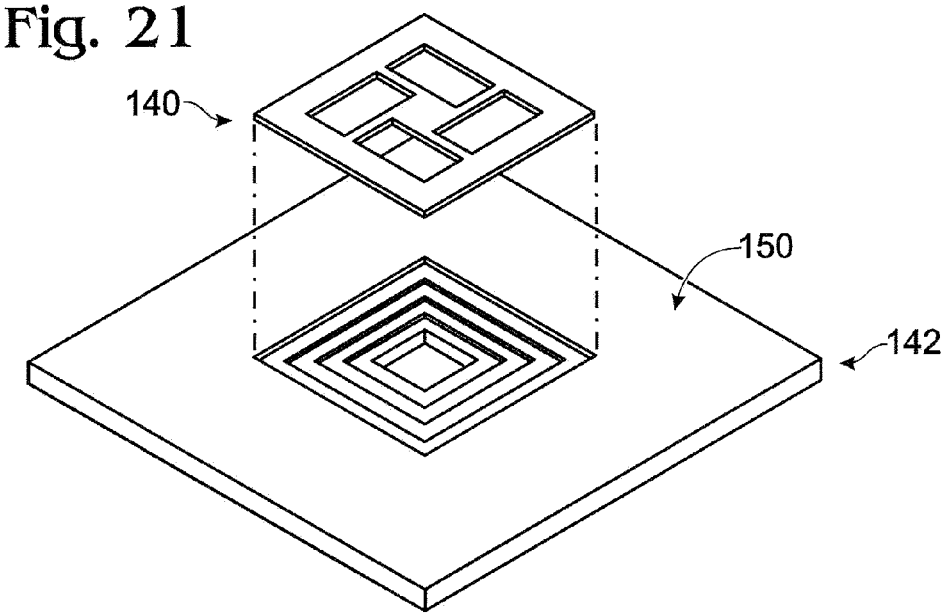
FIG. 21 is an exploded view of the valve element of FIG. 20 and an exemplary support element.
Figure 22:
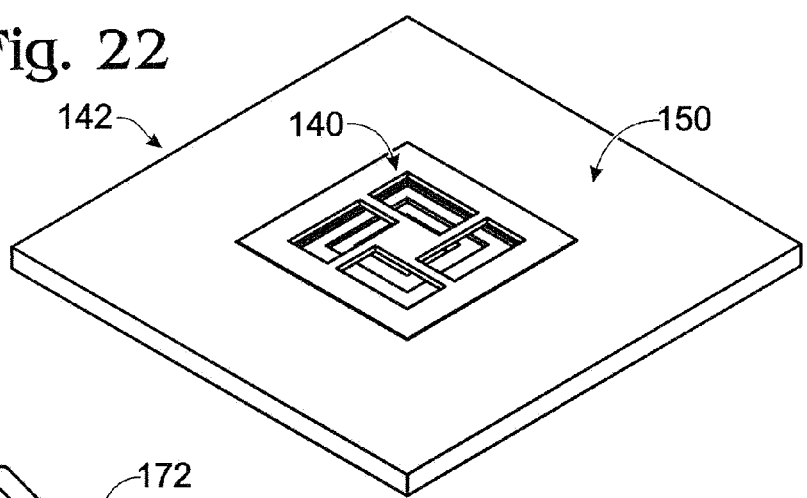
FIG. 22 is an axonometric projection of the valve element and support element of FIG. 21.

FIG. 18 shows a valve element 120 that includes a seating portion 122, a flow-blocking portion 124, openings 126, and bridge portions 128. FIG. 19 shows a different valve element 130 that includes a seating portion 132, a flow-blocking portion 134, and bridge portions 136. Valve element 130 is characterized by a relatively large seating area, and bridge portions that occupy substantially all of the space between the seating portion and the flow-blocking portion when the valve element has a generally planar, undeflected posture. However, when deflected, small slits will open around the bridge portions. FIGS. 20-22 show yet another embodiment of a valve element 140 that includes a seating portion 142, a flow blocking portion 144, openings 146, and bridge portions 148. FIGS. 21 and 22 show a support element configured to cooperate with valve element 142 to produce a desired flow-through. Such cooperation may, but does not necessarily, include variable engagement between the valve element and the support element. Support element 142 includes a support structure 150 that is substantially larger than valve element 140. The valve element and the support element illustrated in FIGS. 20-22, can be made by micro fabrication or photo chemical machining processes. The embodiment illustrated in FIGS. 18-22 is not intended to be limiting, but rather to demonstrate possible variation.

Figure 23:
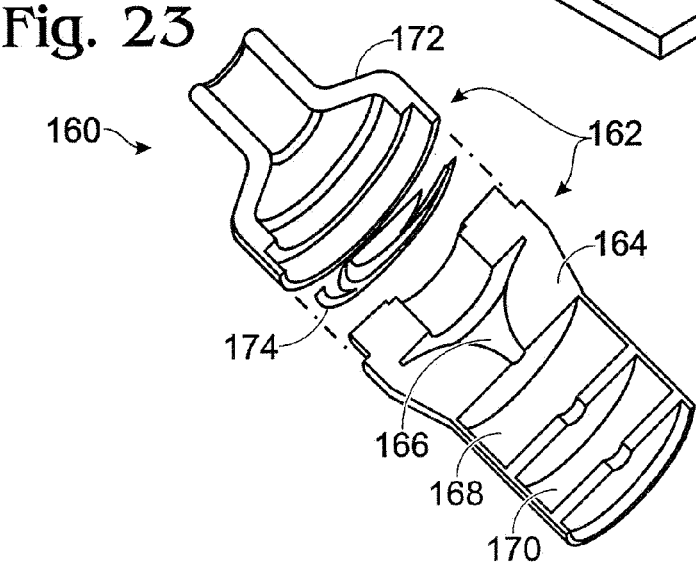
FIG. 23 is an exploded cross-sectional view of an exemplary flow control valve including a vibration suppressor.

FIG. 23 shows an exploded cross-sectional view of a flow control valve 160, which includes a housing 162 that is configured to reduce vibration and/or noise. Housing 162 includes a support element 164 that includes an inlet portion 166, a first expansion chamber 168, and a second expansion chamber 170. In the illustrated embodiment, inlet portion 166 is shaped like a venturi and is configured to create a convergence of flow that is directed into the expansion chambers. Such an arrangement can facilitate a dampening of energy that can create vibrations. Housing 162 also includes a top 172. A valve element 174 can cooperate with housing 162 to regulate the flow of a fluid through the flow control valve.

While FIG. 23 shows a spiraling spring design, non-spiraling support arm designs may also be used, such as shown in FIG. 18, for example. Also, the above planar springs may also include a cantilevered mass that may or may not be integrally formed with a valve element. For example, FIG. 23A shows an alternative embodiment of a valve element 2310 similar to that shown in FIG. 18, yet including a cantilever 2316 that is unitarily formed with the element. Alternatively, the cantilever may be separately formed and attached to the element in a variety of ways. In the particular example of FIG. 23A, the cantilever is formed of a rectangular cross-sectional flexure beam 2314 having a mass 2312 formed at the end via repeated bends and/or folds in the beam. In an alternative embodiment, a separate end mass may be formed of solid material having a different width or size of the beam (see FIG. 23B). In one example, the cantilever is designed to have a natural frequency that resonates with specified engine speeds to generate vibration to reduce ice formation and reduce the likelihood of stiction, freezing, and/or other sludge formation issues. Various parameters may be adjusted to vary the natural frequency, such as beam length, damping, mass, and/or combinations thereof.

Referring now to FIG. 23B, an alternative cantilever beam configuration is shown where the mass 2318 has a different cross-section than the beam 2314.

Figure 23D:
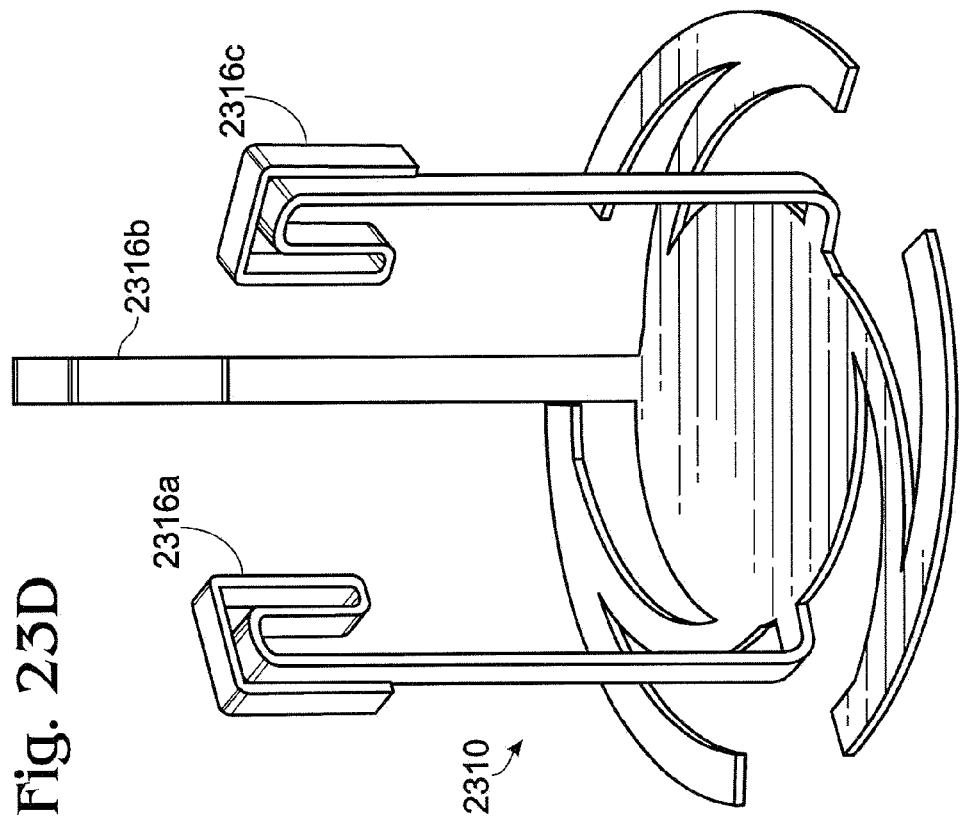
Figure 23C:
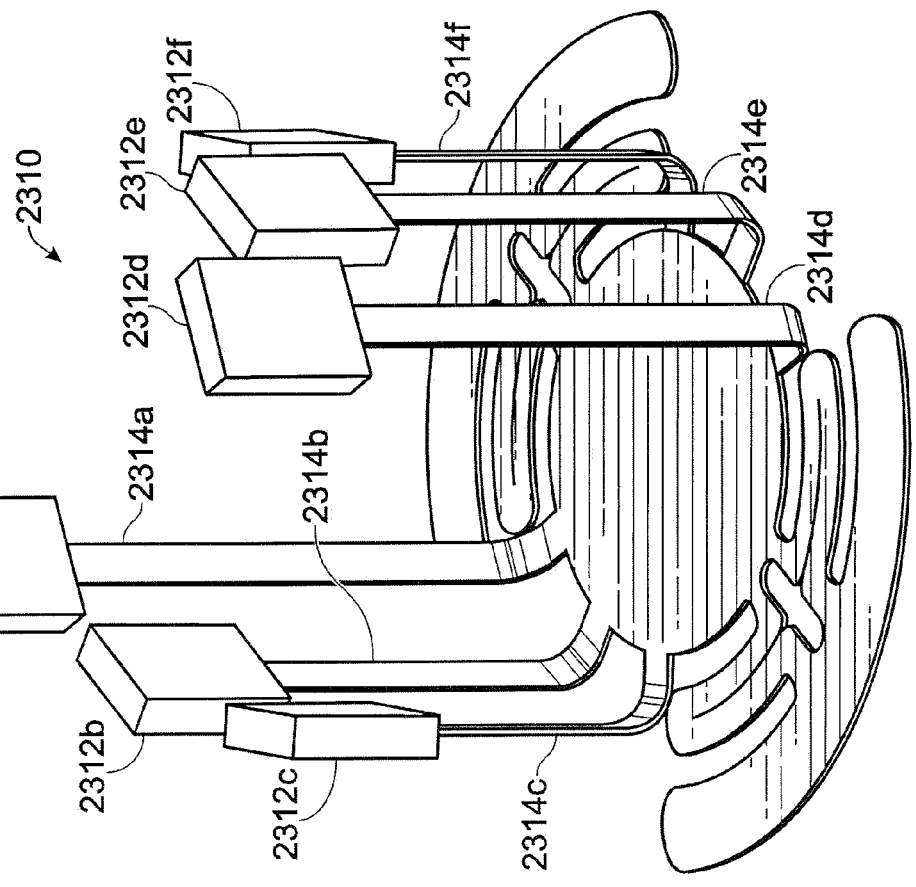
Figures 1, 23D:
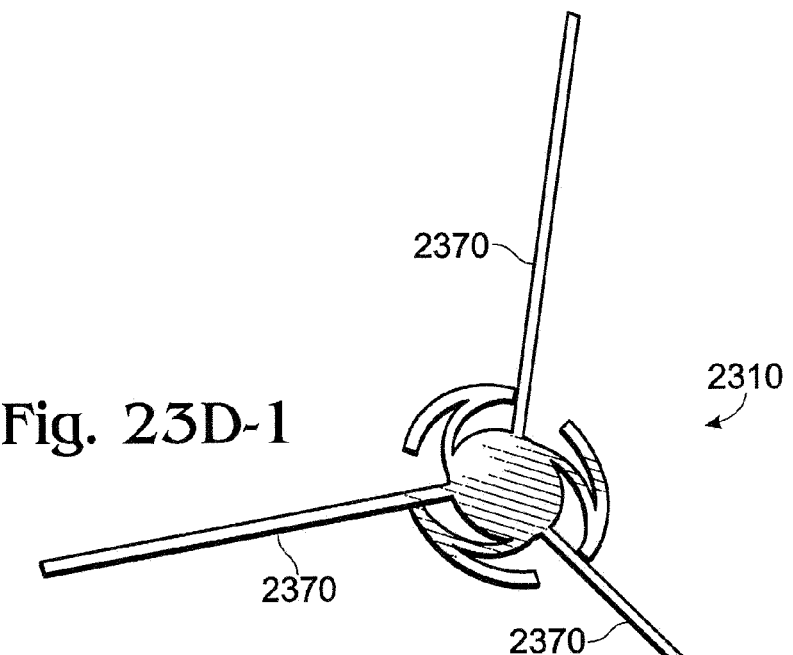

While FIGS. 23A-B show a single cantilevered beam and mass, multiple masses may be used, each with varying properties. In this way, a multitude of natural frequencies may be provided so that vibration is increased at a plurality of engine speeds. This can improve valve resistance to freezing and/or other clogging when the engine operates for extended periods in specified speed ranges, which may be outside of one of the beams' natural frequency range. In this way, improved performance may be achieved. One specific example is shown in FIG. 23C which shows size cantilevers each having a common mass, but different lengths to thereby provide a variety of natural frequencies. In this way, a broader engine speed range can be provided over which sustained vibration is attained. Specifically, the valve element 2310 has a plurality of masses 2312$a$-$f$ (which may each be variable, if desired), attached to beams of varying length. In other words, while this example varies beam length to vary natural frequency, mass may also be varied (at fixed beam lengths) to achieve a similar result. Further any and/or each of beam length, mass, and damping may be varied to provide a range of natural frequencies.

As noted above, various approaches may be used to form the beams and/or masses for the cantilever(s). FIG. 23D shows still another alternative embodiment of a valve element 2310 having spiraling support arms and cantilevers 2316$a$-$c$. In this example, these features may be fabricated during a 2-dimensional process (e.g., stamping) which can then be folded to form the cantilevers beam and mass as shown. FIG. 23D-1 shows the original valve shape before the folding of the beams to create the cantilevered masses. Specifically, FIG. 23D-1 shows unfolded beams 2370 after the initial 2-D forming process.

Figure 23E:
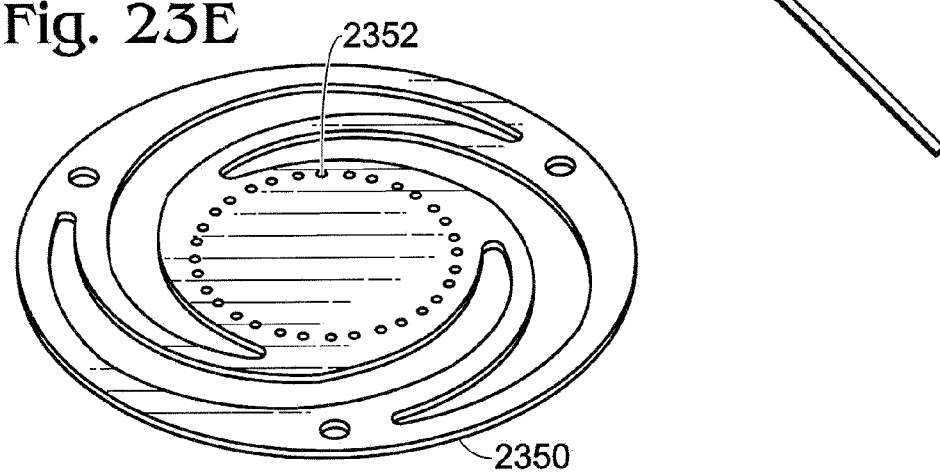

In still another alternative embodiment, additional holes may be formed in the valve element as shown by 2352 in element 2350 of FIG. 23E. In one embodiment, the holes are of a significantly smaller size than the flow passage, e.g., a single hole has a flow area of at least half the flow area of the flow passage. Alternatively, the area can be at least $1/10^{th}$ the flow area of the passage, or smaller. While this example shows spiraling support arms, non-spiraling support arms may also be used. Further, while this example shows a plurality of holes in a center portion of the valve element, the holes may be placed in other locations, and only a single hole may be used if desired. Further still, while FIG. 23E shows circular holes, other shapes may also be used. The number, placement, and size of the hole(s) may be varied to adjust the amount of a stream of air (fluid) that can be used to disrupt vortex shedding or other flow around the disk. In this way, audible vibrations may be reduced, thereby improving engine noise. In this way, at least one hole within a circumference of a one-piece disk may be used to improve performance.

Figure 23F:
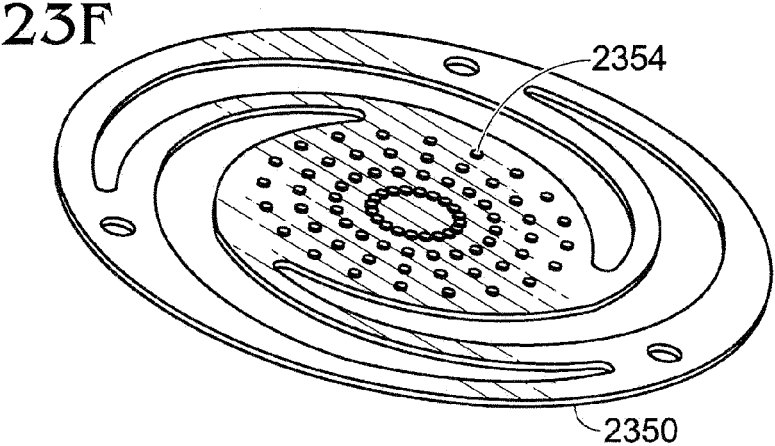

In still another example embodiment, at least one embossment 2354 within the circumference of the valve element (such as the one-piece disk 2350 shown) may be used. The embossment may be formed of a variety of shapes, such as a cylinder (as shown), square, rectangle, pyramid, or others. Further, the size of the embossment is generally substantially smaller than the geometry of the flow through passage. The embossment(s) may be used to increase flow turbulence to disrupt vortex shedding or other flow around the disk resulting in audible vibration. As shown in FIG. 23F, a plurality of embossments 2354 may be at a variety of radii from the center of the element. While this shows that all of the embossments have substantially the same size, embossments of varying size may be used. Further, a combination of holes and embossments may also be used, if desired, to reduce vortex shedding or other noise producing phenomena.

Figure 24:
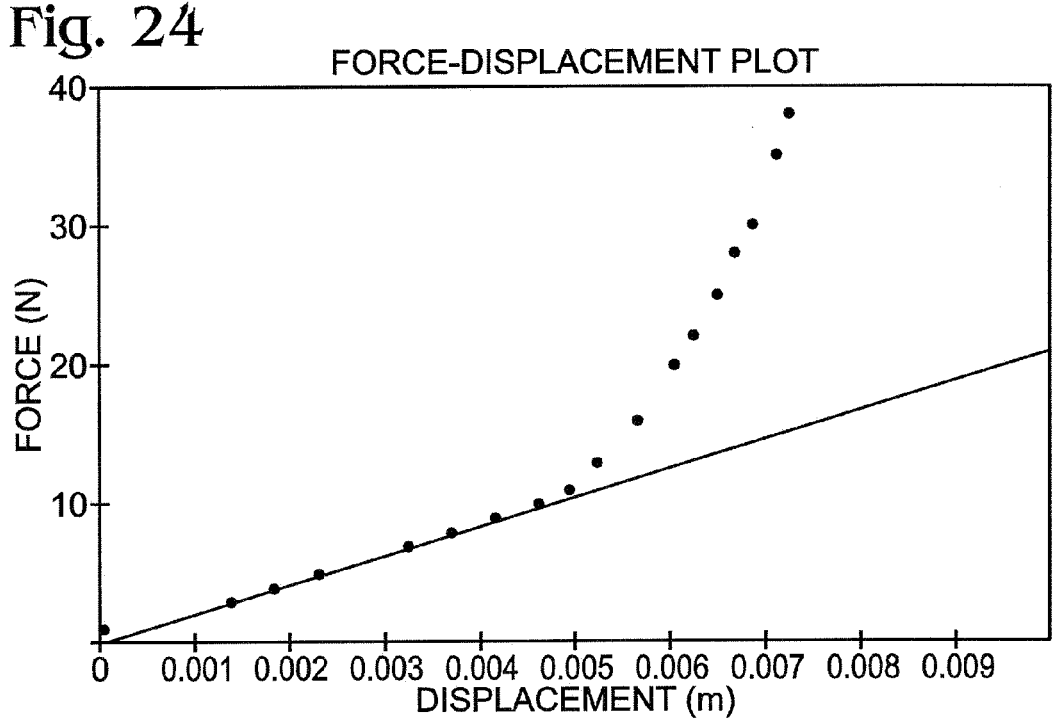
FIG. 24 is a graph showing force versus displacement for an example embodiment spring element.

Referring now to FIG. 24, the plot shows an example force versus deflection curve for an example embodiment via the line with dots, where linear relationship is shown in the solid line. The plot illustrates how variation in the contact point, or points, can interact with the variation in deflection that occurs to produce an effectively increasing spring rate. Note that this is just one example, and that the variation in spring rate could either increase, decrease, or combinations thereof.

Figure 25:
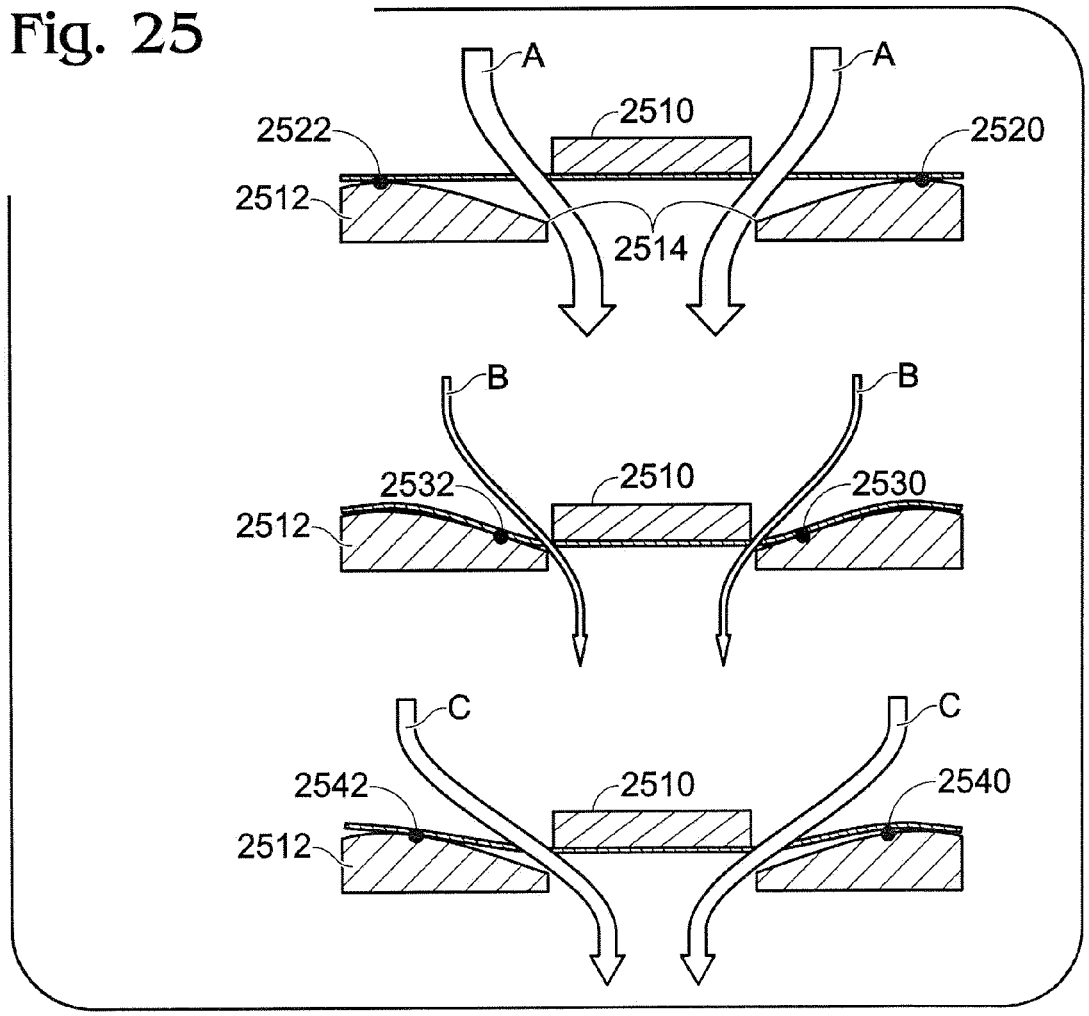
FIG. 25 shows a schematic diagram of an example valve at various amounts of deflection (e.g., at various pressure differentials).

FIG. 25 shows still another alternative example where a flow regulation plate 2510 is used with a curved contact surface 2512, where the figure shows the plate at three different amounts of deflection (and three levels of contact, or lack thereof). Specifically, the top figure shows the flow regulation plate 2510 contacting the surface 2512 at points 2520 and 2522. While this contact is shown as a point, it may be a line of contact or an area of contact, depending on the geometry of the system. Specifically, the top plot shows the system in an un-deflected (or low deflection) mode, where a relatively large flow passage area is created between the plate and the valve seat 2514, as indicated by the two arrows showing direction and approximate amount of flow A.

The middle figure of FIG. 25 shows the plate 2510 in a relatively large deflection position, where the regulation plate 2510 contacts the surface 2512 at points 2530 and 2532. Specifically, the middle plot shows the system in a near maximum deflected (or high deflection) mode, where a relatively small flow passage area is created between the plate and the valve seat 2514, as indicated by the two arrows showing direction and approximate amount of flow B.

Finally, bottom figure of FIG. 25 shows the plate 2510 in a relatively mid-range deflection position, where the regulation plate 2510 contacts the surface 2512 at points 2540 and 2542. Specifically, the bottom plot shows the system in a mid-deflection mode, where a flow passage area larger that the middle figure, but smaller than the top figure, is created between the plate and the valve seat 2514, as indicated by the two arrows showing direction and approximate amount of flow C.

As noted above, the various valve embodiments described herein may be applied to a variety of applications and products, in a variety of scales, and for a variety of purposes. In one example, the valve characteristics can be used in a PCV valve of an engine. Such an application can have several advantageous results, some of which are described below.

In one example, the valve can be positioned at various orientations relative to gravity when coupled to the engine. This can enable positioning the valve in different orientations for different engine designs, thereby providing for improved manufacturability and advantageous location near exhaust ports or the manifold for further freeze resistance. For example, for certain engine packages, the valve may be positioned at a first orientation, whereas for different engine packages (e.g., different engine displacement, different vehicles, different transmissions, different exhaust configurations, different intake configurations, etc.), the valve may be positioned at a second orientation different from the first orientation. Such an approach can also provide improved installation and thereby reduce manufacturing time and cost. In one example, the valve may be positioned on a valve and/or rocker cover near an exhaust side, or in or near the cylinder head.

One specific orientation is shown in FIG. 26, which shows an example half of a V-engine, with a conventional PCV valve location at 2610, which is required to be flush and/or plum mounted in a specific orientation, such as a vertical (or substantially vertical) orientation on the cam cover 2620 as shown. However, according to one example embodiment of the present application, the valve may be mounted in a different orientation, such as shown by valve 2618, which is mounted in a substantially non-vertical orientation. By this arrangement, the valve 2618 may be mounted closer to exhaust manifold 2616 and/or exhaust port 2622 in the cam cover 2620 or in the cylinder head 2612. Alternatively, the valve may be mounted near the intake port 2614.

In another embodiment, insulation may be placed around the PCV valve to improve freeze resistance, as is shown by FIGS. 27, 28, and 29. Specifically, in one example, foam insulation may be used around (or to surround) the valve, which is then enclosed in a plastic sheath, for example. FIG. 27 shows the valve surrounded by insulation 2710, FIG. 28 shows an example valve 2810 and insulation 2812 separated, and FIG. 29 shows at 2910 an opposite view of the insulation of FIG. 27.

In another example, due to improved low and/or high temperature operation, the valve may be positioned in different locations in the crankcase. For example, the valve may be positioned near the intake side, exhaust side, or combinations thereof.

As shown above, various embodiments have been illustrated, some of which provide for improved performance at lower flow rates, while still providing freeze resistance without requiring an electric heater (although such a heater may be used, if desired). Specifically, providing better low flow rate operation enables the reduction of oil pullover to the intake system. Reducing such oil migration can increase catalyst useful life and reduce intake valve fouling, turbo charger fouling (if equipped on the engine), and evaporative emissions. Further, the above design(s) can operate, in some conditions, with less hysteresis due to the flexure design, thereby improving repeatability.

It will be appreciated that the configurations and embodiments disclosed herein are exemplary in nature, and that these specific embodiments are not to be considered in a limiting sense, because numerous variations are possible. For example, the above valve can be applied in a variety of areas, including various types of engines, such as V-6, I-4, I-6, V-12, opposed 4, and other engine types. Also, the valve can be formed of a variety of materials, including metal, plastic, and/or combinations thereof. Further, valve elements may be formed in a variety of ways, including injection molding. For example, a two-piece injection molded housing and a spring steel flexural valve element may be used. In this case, a three-piece design can be formed with high precision, if desired. Further, a heating element may be eliminated in some engine configuration examples, thereby further reducing system cost.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A flow control valve, comprising:
a valve element including at least one opening and configured to deflect from a generally planar posture to an increasingly nonplanar posture responsive to a relative increase in pressure difference across the valve element; and a support element including:
- a support structure supporting the valve element in its undeflected state;
- at least a first contact surface recessed from the support structure and configured to engage the valve element only when the valve element is deflected; and
- a flow passage;

wherein an effective flow-through volume through the at least one opening and the flow passage decreases as deflection of the valve element increases, and wherein the flow passage remains at least partially open after the at least a first contact surface initially engages the valve element, and wherein the valve element is comprised of a one piece disk having at least one mass attached to the end of a cantilevered beam attached to the disk.

2. The flow control valve of claim 1, wherein the one piece disk contains at least one hole, of size substantially smaller than the flow passage located around or within a circumference of the one piece disk to reduce audible vibration caused by a flow through the valve.

3. The flow control valve of claim 1, wherein material is removed from a circumference of the one piece disk to reduce audible vibration caused by a flow through the valve.

4. The flow control valve of claim 1, wherein material is removed from a circumference of the one piece disk in small cuts to reduce audible vibration caused by a flow through the valve.

5. The flow control valve of claim 1, wherein a material at a circumference of the one piece disk has been embossed or deformed to reduce audible vibration caused by a flow through the flow control valve.

6. The flow control valve of claim 1, further comprising a top, wherein the support element and the top collectively house the valve element and are configured to be operatively interposed between a crankcase and an intake manifold in an engine.

7. The flow control valve of claim 6, wherein the at least one mass is formed by folding a part of a flat monolithic material making up the valve element.

8. The flow control valve of claim 6, wherein the cantilevered beam oscillates in response to external excitation.

9. The flow control valve of claim 7, wherein the cantilevered beam oscillates in response to external excitation.

10. The flow control valve of claim 8, wherein the oscillation of the cantilevered beam prevents stiction or ice buildup.

11. The flow control valve of claim 1 further comprising a plurality of separate masses attached to respective ends of respective cantilevered beams attached to the disk.

12. The flow control valve of claim 11 wherein a first mass is cantilevered at a longer length than a second mass.

13. The flow control valve of claim 1 wherein the at least one mass is unitarily formed with the element.

14. A flow control valve, comprising:
- a planar, spiral, one-piece, disk-shaped valve element including an opening, the disk-shaped valve element gradually engaging a support to greater degrees responsive to increasing pressure difference across the disk-shaped valve element to decrease a size of the opening, a flow passage remaining at least partially open after initial engagement between the disk-shaped valve element and the support, the disk-shaped valve element having a plurality of masses attached via different length cantilevered beams.

15. The flow control valve of claim 14 wherein the plurality of masses are integrally formed with the disk-shaped valve element.

16. The flow control valve of claim 14 wherein the plurality of masses include a plurality of bends.

17. The flow control valve of claim 14 wherein the support includes a spiral shaped contact surface, the flow passage remaining partially open after the contact surface initially engages the disk-shaped valve element.

18. The flow control valve of claim 14 wherein the plurality of masses are each positioned around a periphery of the disk-shaped valve element.

* * * * *